United States Patent [19]

Bewersdorf et al.

[11] Patent Number: 5,560,896
[45] Date of Patent: Oct. 1, 1996

[54] METHOD FOR PRODUCING GRANULATED SODIUM PERCARBONATE

[75] Inventors: Martin Bewersdorf; Claas-Jürgen Klasen, both of Rodenbach; Petra Look-Herber, Hanau; Birgit Bertsch-Frank, Rheinfelden; Thomas Lieser, Hanau; Klaus Müller, Hasselroth, all of Germany

[73] Assignee: Degussa Aktiengesellschaft, Frankfurt am Main, Germany

[21] Appl. No.: 457,435

[22] Filed: Jun. 1, 1995

Related U.S. Application Data

[63] Continuation-in-part of Ser. No. 162,395, Dec. 6, 1993, abandoned.

[30] Foreign Application Priority Data

Aug. 31, 1993 [DE] Germany .................. 43 29 205.4

[51] Int. Cl.⁶ .................................................. C01B 31/24
[52] U.S. Cl. ........................................................ 423/415.2
[58] Field of Search ............................................ 423/415.2

[56] References Cited

U.S. PATENT DOCUMENTS

| | | |
|---|---|---|
| 4,313,918 | 2/1982 | Hendriks et al. . |
| 4,428,914 | 1/1984 | Brichard et al. . |
| 5,294,427 | 3/1994 | Sasaki et al. . |

FOREIGN PATENT DOCUMENTS

| | | |
|---|---|---|
| 391121 | 8/1990 | Austria . |
| 727276 | 7/1969 | Belgium . |
| 936672 | 11/1973 | Canada . |
| 0332929 | 5/1991 | European Pat. Off. . |
| 2076430 | 10/1971 | France . |
| 107426 | 8/1974 | Germany . |
| 2328803 | 1/1975 | Germany . |
| 2652776 | 5/1978 | Germany . |
| 2800760 | 7/1979 | Germany . |
| 2060971 | 2/1980 | Germany . |
| 2733935 | 2/1988 | Germany . |
| 594047 | 2/1978 | U.S.S.R. . |
| 1300855 | 12/1972 | United Kingdom . |
| 1469352 | 4/1977 | United Kingdom . |
| 2011874 | 7/1979 | United Kingdom . |
| 1553505 | 9/1979 | United Kingdom . |
| WO95/02555 | 1/1995 | WIPO . |
| WO95/06519 | 3/1995 | WIPO . |

OTHER PUBLICATIONS

Kirk–Othmer, *Encyclopedia of Chemical Technology*, Third Edition, vol. 21, pp. 77–103 (no date available).

Hans Uhlemann, "Kontinuierliche Wirbelschicht–Spruehgranulation," *Chem.–Ing.–Technik*, 62 (1990), No. 10, pp. 822–834.

*Primary Examiner*—Wayne Langel
*Attorney, Agent, or Firm*—Beveridge, DeGrandi, Weilacher & Young, L.L.P.

[57] ABSTRACT

Sodium percarbonate is produced by means of fluidized bed granulation. The process includes spraying an aqueous sodium carbonate solution and a hydrogen peroxide solution onto nuclei in a fluidized bed and evaporating the water. In the process of the invention, it is not necessary to use a phosphorus-containing crystallization inhibitor in order to avoid cloggings and incrustations in and on the nozzle. This is accomplished by spraying the solutions through separate channels in a single ternary atomizer nozzle, to provide external mixing of the solutions with respect to the nozzle.

15 Claims, 2 Drawing Sheets

METHOD FOR PRODUCING GRANULATED SODIUM PERCARBONATE

RELATED APPLICATION DATA

This application is a continuation-in-part of U.S. patent application Ser. No. 08/162,395 filed Dec. 6, 1993 abandoned. This U.S. patent application is entirely incorporated herein by reference.

BACKGROUND OF THE INVENTION

The invention relates to a method of producing granular sodium percarbonate by means of fluidized bed granulation.

Various methods are known for producing sodium percarbonate with the formula 2 $Na_2CO_3.3\ H_2O_2$. One method involves the conversion of hydrogen peroxide with sodium carbonate in aqueous phase, crystallization of the sodium percarbonate and the separation of the sodium percarbonate from the mother liquor. A second method requires conversion of solid soda with aqueous hydrogen peroxide. A third method includes fluid bed granulation, wherein a hydrogen peroxide solution and a soda solution are sprayed into a fluidized bed apparatus onto nuclei of sodium percarbonate and at the same time water is evaporated.

The first method described above is used on an industrial scale; however, auxiliary substances such as sodium chloride for salting out and metaphosphates for controlling the crystallization are required. In addition, a purification and/or partial discharge of the mother liquor is/are necessary in order to achieve a good product quality.

The quality of sodium percarbonate produced according to the second method described above is usually not comparable to that of sodium percarbonate produced according to either the first or third methods on account of inhomogeneities which occur and on account of unsatisfactory storage stability.

The use of the third method described above is becoming increasingly more interesting because it does not result in any accumulation of waste water. It also results in a very high yield in wear-resistant sodium percarbonate. German Patent 20 60 971 teaches such a method. This patent document is entirely incorporated herein by reference. According to this method, a fluidized bed containing sodium percarbonate nuclei whose dimensions are smaller than those of the granulate particles to be produced is continuously charged with a sodium percarbonate solution or sodium percarbonate suspension. Alternatively, the bed is separately and simultaneously charged with an aqueous hydrogen peroxide solution and an aqueous sodium carbonate solution, and water is continuously evaporated from the aqueous environment containing sodium percarbonate. Granulated particles of a certain size are drawn out of the fluidized bed. When a sodium percarbonate solution or an $H_2O_2$ solution and an $Na_2CO_3$ solution is/are used, nuclei are introduced simultaneously into the fluidized bed.

The method described above exhibits a number of disadvantages. In one embodiment, a sodium percarbonate solution or suspension must first be produced, which necessitates an additional method step. The charging of a fluidized bed with a sodium percarbonate suspension or solution supersaturated with sodium percarbonate is, in addition,,prone to problems because the injection nozzles rapidly becomes clogged. On the other hand, if a dilute sodium percarbonate solution is used, much water must be evaporated. This increases the expense.

German Patent 27 33 935 points out problems of a further embodiment taught in German Patent 20 60 971 C3. German Patent 27 33 935 also is entirely incorporated herein by reference. As described in German Patent No. 27 33 935, when using an aqueous hydrogen peroxide solution and an aqueous sodium carbonate solution employing two separate injection nozzles, e.g., customary two-component nozzles for spraying a solution with co-usage of air as a propellant, it is difficult to achieve a sufficiently intimate mixture of the two solutions in the fluidized bed. However, it is necessary to have such intimate mixing in order to obtain homogeneous sodium percarbonate particles. If the two solutions are introduced in common into the fluidized bed through a single injection nozzle, a crystallization usually takes place in the injection nozzle after a brief operating time, which results in clogging and interruptions of the operation.

In order to eliminate the above-mentioned problems, German Patent 27 33 935 C2 suggests using a common injection nozzle for both solutions and, in order to avoid a clogging of the injection nozzle, dissolving a metaphosphate in at least one of the two solutions. The mixing of the two solutions takes place in the interior or at the inlet of the injection nozzle. The amount of metaphosphate used is advantageously between 0.1 and 20 grams per kg sodium percarbonate.

The co-usage of a metaphosphate in the method of German Patent 27 33 935 C2 is undesirable because it elevates the expense for raw materials. Additionally, the phosphate component is introduced into the sodium percarbonate, and therewith into the washing, bleaching and cleaning agents containing the sodium percarbonate. Those skilled in the art are becoming increasingly more interested in eliminating phosphates from such products for ecological reasons.

SUMMARY OF THE INVENTION

The present invention provides a method for the production of granular sodium percarbonate, preferably sodium percarbonate having the formula 2 $Na_2CO_3.3H_2O_2$, by means of fluidized bed granulation. In this method, an aqueous hydrogen peroxide solution and an aqueous sodium carbonate solution are conveyed through separate channels of a spray nozzle and sprayed into a fluidized bed which contains nuclei whose dimensions are less that those of the granulate particles to be produced. At the same time, water is evaporated at a fluidized bed temperature in the range of 40° to 95° C. The method in accordance with the invention does not exhibit the disadvantages of the method known from German Patent 27 33 935 C2.

In the method in accordance with the invention, a ternary atomizer nozzle with external mixing of the solutions is used for spraying the two solutions. No crystallization inhibitor is added to the solutions in the process of this invention. More specifically, phosphorus-containing crystallization inhibitors, such as metaphosphates, are not necessary.

In the process of the invention, aqueous hydrogen peroxide solution, aqueous sodium carbonate solution and a propellant are individually conveyed through separate channels defined in a single nozzle. Mixing takes place external of the nozzle, and in this manner, the nozzle does not become plugged. Thus, crystallization inhibitors are not needed.

It is advantageous if a ternary atomizer nozzle including a nozzle body and a nozzle mouthpiece is used in the process of the invention. In this embodiment, the nozzle mouthpiece includes a central tube and two jacket tubes arranged coaxially around it. One of the solutions is supplied to the central tube, and the other solution is supplied to the inner annular slot formed between the central tube and the inner jacket tube. A propellant is supplied to the outer annular slot formed between the inner and outer jacket tubes. According to an especially preferred embodiment, a ternary atomizer nozzle of the above-mentioned type is used whose central tube extends at the nozzle tip by at least one central tube radius beyond the ends of the jacket tubes.

In a preferred embodiment, aqueous hydrogen peroxide solution is transmitted through the central tube, aqueous sodium carbonate solution is transmitted through the inner annular slot formed between the central tube and the inner jacket tube, and a propellant is transmitted through the outer annular slot formed between the inner jacket tube and the outer jacket tube. However, the hydrogen peroxide alternatively could be separately transmitted through the inner annular slot or the outer annular slot. Similarly, the sodium carbonate solution also may be transmitted through the central tube or the outer annular slot. Likewise, the propellant may be separately transmitted through the central tube or the inner annular slot.

As a result of using a ternary atomizer nozzle with external mixing, the two solutions, each of which contains a reaction partner, are conveyed through a nozzle and sprayed into the fluidized bed. Once in the fluidized bed, the mixing of the two solutions occurs and, subsequently, the formation of sodium percarbonate takes place outside of and beyond the end of the nozzle, but before the water of the liquid droplets evaporates. Homogeneously built-up sodium percarbonate particles are produced in this manner without clogging the nozzle. The use of a nozzle with a nozzle mouthpiece in accordance with the invention, and especially with a mouthpiece having a central tube extension, permits the avoidance of incrustations on the nozzle tip. Operational problems are thereby avoided, even during a long operating time. In the method in accordance with the invention, the use of a metaphosphate or of another phosphorus-containing crystallization inhibitor is rendered unnecessary. Therefore, the granular sodium percarbonate produced is essentially free of phosphorus compounds. A very slight phosphate content in the sodium percarbonate is not excluded if hydrogen peroxide stabilized in a commercially customary manner with phosphates is used. However, the phosphates used in hydrogen peroxide stabilized with phosphates is not considered to be a crystallization inhibitor, as that term is used in this specification.

The basic principle of the ternary atomizer nozzle to be used is similar to that known for commercial binary nozzles, but it additionally contains devices for the introduction of and the guiding of the second liquid in the nozzle. The nozzle therefore includes a nozzle body with conduits separated from each other and with connections for the media as well as a nozzle mouthpiece with the features described in more detail below.

BRIEF DESCRIPTION OF THE DRAWINGS

The advantageous aspects of the invention will be more fully understood when considered in conjunction with the following detailed description and attached drawings, wherein.

DETAILED DESCRIPTION OF THE INVENTION

The invention will now be described in terms of specific embodiments and examples. These embodiments and examples should be considered as illustrative of the invention, and not as limiting the same.

Figure 1:
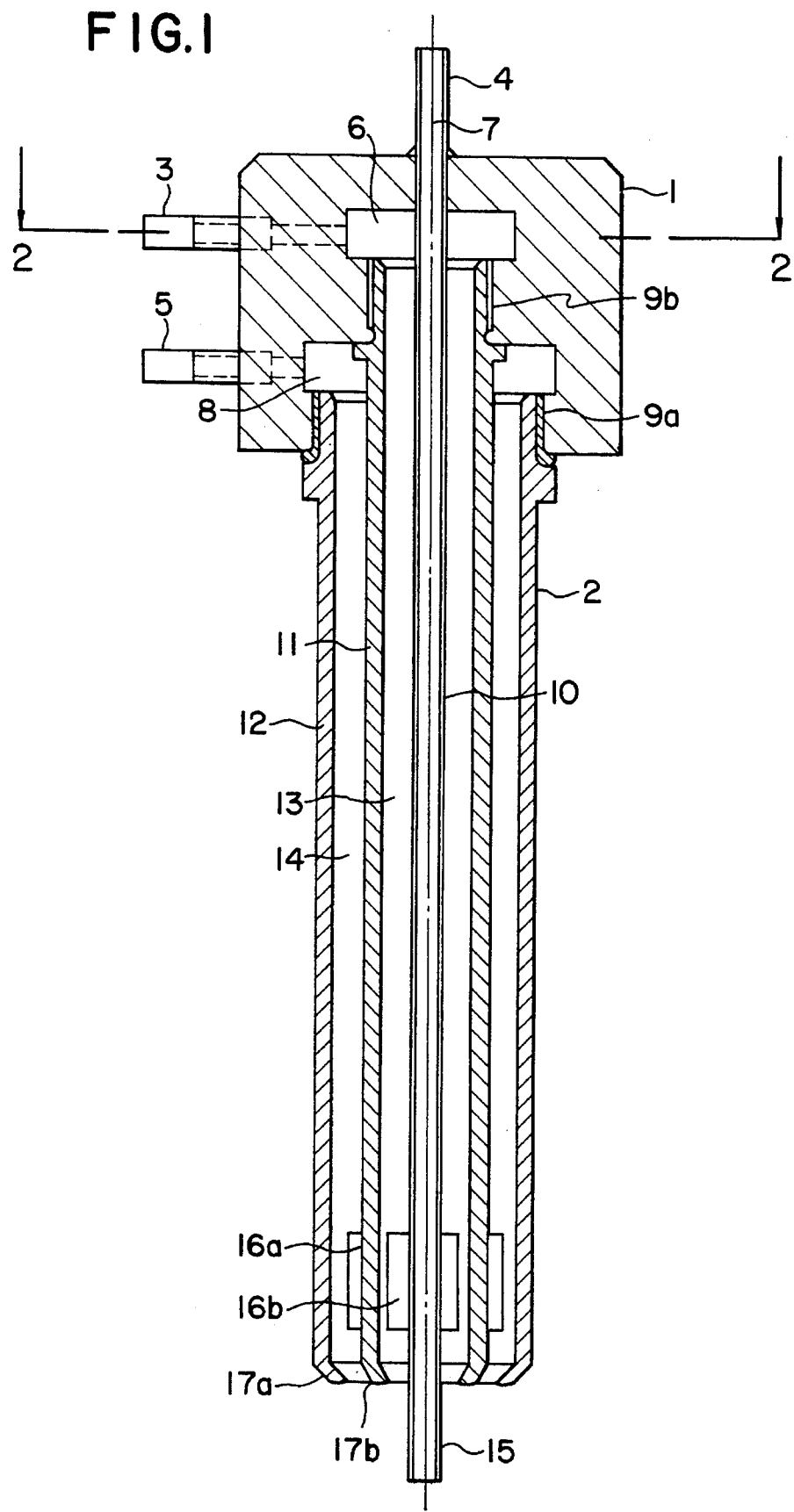
FIG. 1 shows a ternary atomizer nozzle for use in the invention.
Figure 2:
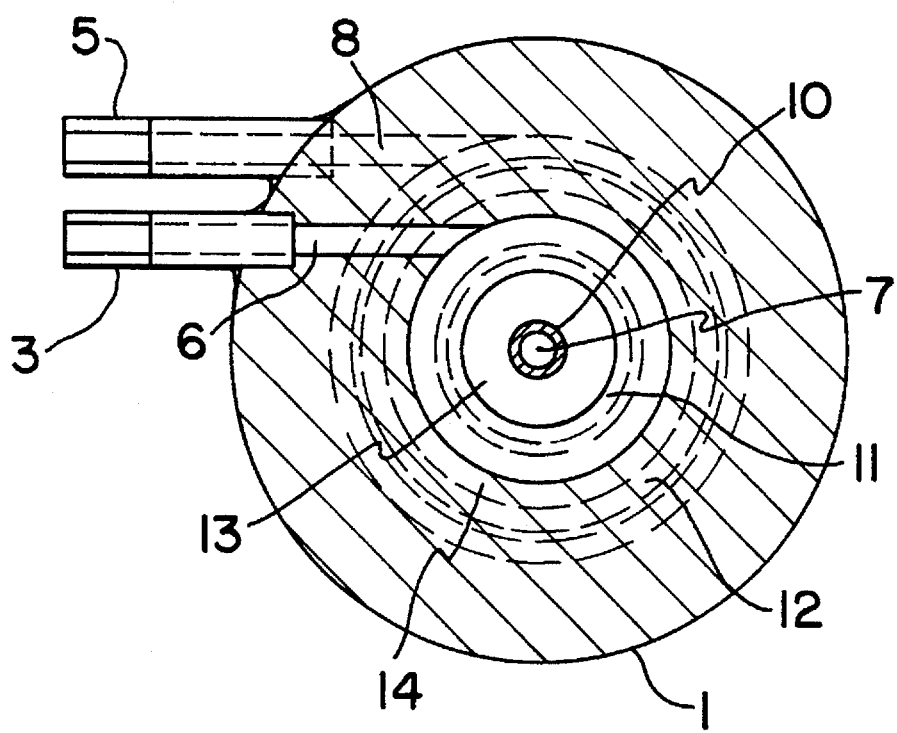
FIG. 2 shows a cross-sectional view of the nozzle of FIG. 1.

The design of an advantageous ternary atomizer nozzle in accordance with the invention is shown in FIGS. 1 and 2, including the especially preferred embodiment of the nozzle mouthpiece. FIG. 1 shows an especially preferred ternary atomizer nozzle in longitudinal section. FIG. 2 shows a cross section through line 2—2 indicated in FIG. 1.

A nozzle body 1 is connected to a nozzle mouthpiece 2 in such a manner that the various, different liquid media being transported do not come into contact with each other until the liquids are outside and beyond the end of the nozzle. The connection between body 1 and mouthpiece 2 can be designed in the form of an insertion, bayonet, screw closure or sleeves, or any other such suitable connection known to those skilled in the art. In the preferred embodiment according to FIG. 1, jacket tubes 11 and 12 of the nozzle mouthpiece 2 are connected by screw threads 9a and 9b to the nozzle body 1. The nozzle body 1 contains connections 3 and 4 for the two liquids to be mixed, and a connection 5 for the propellant, as well as separate conduits 6 and 7 for the two liquids and conduit 8 for the propellant.

Nozzle mouthpiece 2 includes a central tube 10 and two jacket tubes 11 and 12 arranged coaxially around the central tube 10. Central tube 10 communicates with conduit 7. In FIG. 1, conduit 7 and central tube 10 are designed as a through tube. Inner annular slot 13 formed between central tube 10 and inner jacket tube 11 communicates with conduit 6. Outer annular slot 14 formed between the inner jacket tube 11 and the outer jacket tube 12 communicates with conduit 8. An essential feature of an especially preferred embodiment is the central tube extension 15, which extends at the nozzle tip beyond the ends of the jacket tubes 11 and 12. One or both jacket tubes 11 and 12, as well as the central tube 10, can taper toward the nozzle tips (17a and 17b in FIG. 1) in order to elevate the exit speed of the liquid media and to favor a tearing up of the liquid current and propellant current exiting from the annular slots 13 and 14. In addition, swirl bodies 16a and 16b also can be contained in central tube 10 or its extension 15 and/or in one or both annular slots 13 and 14. The propellant can be air or another inert gas, e.g., nitrogen, or also superheated water vapor.

According to a preferred embodiment of the nozzle, the central tube 10 of the nozzle mouthpiece 2 extends by at least one central tube radius, preferably by 2 to 10, and especially 3 to 6 central tube radii, beyond the ends of the jacket tubes 11 and 12. The jacket tubes 11 and 12 preferably terminate at the same height. However, the jacket tubes also can terminate at different heights, but the central tube extension 15 must extend beyond both jacket tubes 11 and 12. In as far as the outer jacket tube 12 extends beyond the inner jacket tube 11, the liquid in the annular slot 13 and the propellant are premixed within the nozzle. However, the liquids themselves do not come in contact with each other until outside of the nozzle.

The optimum dimension of the central tube extension 15 is a function of the central tube 10 radius and of the cross section of the stream at the exit of the inner annular slot 13. As the central tube 10 radius increases, it is generally advantageous to shorten the central tube extension 15. For example, at a central tube 10 radius of at least 2 mm, the central tube extension 15 is usually between 3 and 5 central tube radii. One skilled in the art can readily determine the optimum extension distance for a given situation by routine experimentation.

In principle, either the aqueous $H_2O_2$ solution or the $Na_2CO_3$ solution (also called "soda" in this specification) can be transported through the central tube 10 of the nozzle, and the other solution through the adjacent inner annular slot 13. However, it is preferable that the solution with the lesser volume (in the case of preferred concentrations of the solutions, this is typically the hydrogen peroxide solution) be guided through the central tube 10.

The aqueous hydrogen peroxide solution and the aqueous sodium carbonate solution are introduced in such a ratio into the fluidized bed maintained in a device for fluidized bed granulation such that the molar ratio of $Na_2CO_3$ to $H_2O_2$ is in a range between 1 to 1.4 and 1 to 1.7; a molar ratio between 1 to 1.5 and 1 to 1.65 is preferred.

The concentration of the solutions can be within broad limits. It is advantageous if the highest possible concentrations are selected, in order to reduce the amount of water to be evaporated. According to an especially preferred embodiment, the $Na_2CO_3$ solution and the $H_2O_2$ solution have a very high concentration so that the solution which is at first present in droplet form in the mixing range in front of the nozzle tip is supersaturated with sodium percarbonate. The aqueous hydrogen peroxide solution customarily contains 30 to 75% by weight $H_2O_2$, preferably 40 to 70% by weight $H_2O_2$, The $Na_2CO_3$ concentration of the sodium carbonate solution is advantageously above 10% by weight $Na_2CO_3$, preferably between 20% by weight and the saturation concentration at the particular temperature. The concentration of $Na_2CO_3$ is especially preferably at about 30% by weight. One or both solutions, but preferably the soda solution, can be used in a form preheated to 30° to 70° C., instead of at the usual storage temperature.

A sufficient number of nuclei must always be present in the fluidized bed during start up and during continuous operation of the fluidized bed. For example, the nuclei present during start up may be left over sodium percarbonate nuclei from the last time that the fluidized bed unit was operated. If the unit is operating continually, a balance must be struck between the numbers of granulate particles produced and the number of nuclei introduced (or formed in situ) in the fluidized bed. In order to control the grain distribution of the product, and to allow the grain distribution to be adjusted precisely and quickly, between 0 and 30 kg nuclei, and preferably between 1 and 10 kg nuclei, (e.g., sodium percarbonate nuclei or sodium carbonate nuclei) are supplied to the fluidized bed per 100 kg granular sodium percarbonate removed from the fluidized bed. The weight amount of nuclei is a function of the desired grain spectrum and especially of the size of the nuclei. An optimization of the operating conditions regarding the introduction of nuclei at a desired fluid bed temperature is necessary in order to achieve a stationary operating state. If too large an amount of very fine material is added as nuclei, too low a particle growth can occur. If there is too much moisture in the fluidized bed, an undesired formation of aggregates can occur. Typically, the average grain spectrum of the granulate will fall if the amount of nuclei is increased. If too few nuclei are present, the granulate grains tend to get too large, such that eventually, fluidized bed granulation cannot be satisfactorily maintained. In one embodiment, about 20 kg of nuclei are added for every 1000 kg of product produced.

To get an overview of the general technique for fluidized bed granulation, the mutual influence of the operating parameters, and the control of the particle size and particle distribution, as well as suitable devices for a continuous fluidized bed granulation, the article by H. Uhlemann in Chem.—Ing. Technik 62 (1990), No. 10, pp. 822–834 is suggested. This article is entirely incorporated herein by reference. Fluidized-bed granulation and other size enlargement devices and methods also are described in Kirk-Other's *Encyclopedia of Chemical Technology*, (Third Edition), Vol. 21, pgs. 77–102. This excerpt is entirely incorporated herein by reference.

It is preferred that the nuclei added to the fluidized bed are nuclei of sodium percarbonate. However, any other suitable nuclei can be used in accordance with the invention. For example, sodium carbonate (soda) nuclei, hydrates of sodium carbonate and hydrates of sodium percarbonate are suitable as nuclei in place of sodium percarbonate. The active oxygen content of the sodium percarbonate produced is not adversely influenced by the use of sodium carbonate nuclei. When using sodium carbonate or hydrates thereof as nuclei, it may be necessary to adjust the molar relation between the reaction partners (i.e., the hydrogen peroxide solution and the sodium carbonate solution) which are sprayed into the reactor. In other words, it may be necessary to provide the hydrogen peroxide solution in excess to the sodium carbonate solution. This is because when sodium carbonate also is used as the nuclei, some of the sodium carbonate nuclei are converted to sodium percarbonate product.

Other materials can be used as nuclei, so long as the nuclei materials are stable under the fluidized bed granulation conditions. Materials which also are used in the composition of washing agents (detergents) can be used as the nuclei, such as zeolites or other silicate-like detergent builders.

The nuclei materials also may be used individually or in mixtures, without departing from the invention.

The amount of the nuclei present in the fluidized bed also can be varied, as noted above. Preferably, the amount of nuclei is in the range of greater than 0 to 20% by weight, based on the weight of the delivered product recovered from the fluidized bed. The optimum amount of nuclei may be dependent on various factors, such as the dwell time of the materials in the fluidized bed granulation device and the desired average grain size of the product. As an example, to grow product from nuclei having an average diameter of 0.2 mm to a product having an average diameter of 0.6 mm, the nuclei volume should be about 4% of the total volume. The nuclei to be added may be very small, dust-like particles, as compared to the sodium percarbonate granulates produced. Furthermore, instead of adding nuclei to the bed, nuclei can be formed in the fluidized bed. This may be accomplished by abrasion or by the use of nuclei destroying devices.

The temperature of the fluidized bed is maintained between 40° and 95° C., preferably between 40° and 90° C., 40° and 80° C., and especially between 50° and 70° C. The lower temperature limit lies above the dew point of the fluidization gas at the exit of the fluidizing bed. If the temperature falls below the dew point, drying is not possible. A temperature above the dew point to about 70° C. is preferred.

The temperature of the supply air for drying and maintaining the fluidized bed is adjusted to a value above 120° C., preferably between 200° and 400° C., and especially between 300° and 400° C. Those skilled in the art will know to adjust the temperature and the mass flow of the supply air in such a manner that a well-fluidized fluid bed results. The required performance can be achieved such that not too great an amount of product from a following dust separator has to be returned. The speed of the drying air in the empty tube is customarily between 1 and 4 m/s. In general, the fluidized bed apparatus is operated in such a manner that approximately normal pressure (about 1 bar) prevails in the area of the fluidized bed; however, it also is possible to work at a negative pressure or overpressure. One or more ternary atomizer nozzles can be arranged in the fluidized bed granulation system, and the direction of spray can be essentially the same as that of the current of drying air, or opposite to it, or it can assume an intermediate position.

It has proven to be advantageous in a continuous operation to discharge the sodium percarbonate with a residual moisture content of up to 10% by weight, preferably between 3 and 9% by weight, and especially between 5 and 8% by weight from the fluidized bed and, in as far as desired, to dry it in a subsequent device to a residual moisture content of a commercial item (below 1% by weight) or to supply it to a posttreatment. Potential posttreatments include particular methods for applying a casing onto the particles in order to increase the storage stability. Such a posttreatment is preferably based on the fact that one or more casing components, such as solutions containing e.g., boron compounds, soda, sodium sulfate, magnesium sulfate and water glass, are applied in a fluidized bed onto the previously produced granular sodium percarbonate under simultaneous evaporation of water and the formation of an adherent casing coating.

If needed, additives, with the exception of phosphorus-containing crystallization inhibitors, also can be added to the $H_2O_2$ solution and/or $Na_2CO_3$ solution. Such additives may be included in order to influence the product qualities and especially to elevate the active oxygen stability of the hydrogen peroxide used and of the sodium percarbonate to be produced. Potential additives which elevate the active oxygen stability are preferably magnesium salts (usually added to the $H_2O_2$ solution in the form of the sulfate) and water glass (usually added to the soda solution). Examples of further additives include stannates, complexing agents and dipicolinic acid. Any additives, of course, should not react with the reactants and should not hinder sodium percarbonate production. Phosphorus-free crystallization retarders can be present but are usually not used. The addition of surface-active substances can be used, for example, to elevate the rate of dissolution.

The devices for fluid-bed granulation can be like those described in German Patent 27 33 935, European Patent 0,332,929 B1 and in the already-cited article by H. Uhlemann. The European patent document also is entirely incorporated herein by reference. The fluidized bed can be equipped with one or preferably with several ternary atomizer nozzles in accordance with the invention. Devices with nuclei charging and a discharge of the granulate which acts in a classifying manner are preferred. The nuclei to be charged into the fluidized bed can stem from dust separation, sieving and/or a partial comminution.

In addition to the previously named devices with a stationary fluidized bed, the method can also be carried out in a fluid-bed flow channel equipped with several nozzles in series. Classifying may be carried out at the end of the flow channel, and undersized granules, as well as optionally comminuted oversized granules, are returned into the flow channel.

Although the method of the invention is preferably carried out in a continuous manner on an industrial scale, that is, with continuous supplying of the solutions and discharging of granulate of the desired size, it also can be run in a discontinuous manner by breaking off the spraying upon attainment of the desired grain spectrum, and then discharging the granulate.

The method of the invention makes it possible, starting with a hydrogen peroxide solution and a sodium carbonate solution, to obtain granulated sodium percarbonate by means of fluidized bed granulation on an industrial scale without operational disturbances due to clogging or incrustation of the nozzles, in almost quantitative yield with high active oxygen content, high wear resistance, high bulk weight and very good storage life, without having to use crystallization inhibitors. The product obtainable in accordance with the invention can be coated immediately in a known manner following its production in order to elevate its stability. Due to the dense and essentially spherical grain structure, a lesser amount of coating material suffices than is necessary to coat sodium percarbonate obtained by other crystallization methods.

It is unexpected that the use of a ternary atomizer nozzle in accordance with the invention would make possible both a sufficient external mixing of the solutions and the production of a homogeneous product, as well as make it possible to eliminate the use of phosphorus-containing crystallization inhibitors. These advantages result in lower operating expenses and avoid ecological problems. Furthermore, it could not have been expected that it is possible to practically completely avoid operational disturbances due to incrustations at the nozzle by using a ternary atomizer nozzle with a central tube extension.

The invention will now be illustrated in the following specific Examples.

EXAMPLES

An aqueous hydrogen peroxide solution and an aqueous sodium carbonate solution which contained no crystallization retarders are introduced using air as a propellant into the fluidized bed in an apparatus for fluidized bed granulation, including devices for dust return and nuclei charging, as well as a classifying discharge after fluidization of sodium percarbonate. The starting materials are introduced by means of ternary atomizer nozzles in accordance with the invention. The nozzles were located within the fluidized bed, and the direction of spray was aligned with the current of drying gas. The central tube extension was 3 central tube radii, and the jacket tubes ended at the same height.

Table 1 shows essential operating parameters and material data of the sodium percarbonate produced. Even after several days of continuous operation neither cloggings nor incrustations occurred in or around the nozzle.

TABLE 1

| Example No. | Holdup[1] WS (Gt/h) | Temp.[1] WS (°C.) | CHARGE Soda[2] solution (Gt/h) | $H_2O_2$[3] solution (Gt/h) | Nuclei[4] (Gt/h) | DISCHARGE NaPc[5] (Gt/h) | Oa[6] | Moisture (%) | SIEVE ANALYSIS (%) >0.8 mm | 0.6–0.8 mm | 0.2–0.6 mm | <0.2 mm |
|---|---|---|---|---|---|---|---|---|---|---|---|---|
| 1 | ca. 100 | 57 | 120 | 43 | 8 | 61 | 13.8 | 4.3 | 4.2 | 80.7 | 13.5 | 1.6 |
| 2 | ca. 100 | 57 | 120 | 43 | 7 | 60 | 13.7 | 4.1 | 3.8 | 40.2 | 53.6 | 2.4 |
| 3 | ca. 100 | 57 | 120 | 29 | 9 | 64 | 13.5 | 6.3 | 6.7 | 85.2 | 7.6 | 2.4 |
| 4 | ca. 100 | 58 | 225 | 55 | 14 | 118 | 13.6 | 5.4 | 22.3 | 75.0 | 2.4 | 0.3 |
| 5 | ca. 100 | 59 | 225 | 55 | 0 | 105 | 13.9 | 2.5 | 1.7 | 12.1 | 84.1 | 2.1 |
| 6 | ca. 100 | 59 | 225 | 55 | 12 | 131 | 13.5 | 7.6 | 7.2 | 84.6 | 7.6 | 0.6 |
| 7 | ca. 100 | 59 | 225 | 55 | 0 | 121 | 13.5 | 7.5 | 90.2 | 8.6 | 1.1 | 0.1 |
| 8 | ca. 100 | 59 | 225 | 60 | 12 | 130 | 13.7 | 7.3 | 7.6 | 86.2 | 5.7 | 0.5 |

Gt/h: = parts by weight/hour; NaPC = sodium percarbonate

TABLE 1-continued

| Example No. | CHARGE | | | | | DISCHARGE | | | | | | |
|---|---|---|---|---|---|---|---|---|---|---|---|---|
| | Holdup[1] WS (Gt/h) | Temp.[1] WS (°C.) | Soda[2] solution (Gt/h) | $H_2O_2$[3] solution (Gt/h) | Nuclei[4] (Gt/h) | NaPc[5] (Gt/h) | Oa[6] | Moisture (%) | SIEVE ANALYSIS (%) | | | |
| | | | | | | | | | >0.8 mm | 0.6–0.8 mm | 0.2–0.6 mm | <0.2 mm |

[1] = amount of product and temperature in the fluidized bed.
[2] = concentration: 30% by weight $Na_2CO_3$; temperature of the solution 35° C.
[3] = Examples 1 to 3: concentration = 40% by weight $H_2O_2$; Examples 4 to 8: concentration = 60% by weight $H_2O_2$.
[4] = Ground sodium percarbonate product with a grain spectrum between 0.05 and 0.2 mm was supplied as nuclei.
[5] = Certain losses of solid material occurred as a consequence of a dust separator which was not adapted to the product.
[6] = active oxygen content of the discharged, moist sodium percarbonate.

While it is preferred to produce sodium percarbonate having the formula 2 $Na_2CO_3$.3 $H_2O_2$ by the method according to the invention, it also is possible to produce other sodium percarbonates by this method. Products having a different molar ratio of $Na_2CO_3$ to $H_2O_2$ may be produced. Sodium percarbonate, which can also exist in the form of hydrates, may be produced by the method of the invention. For example, during decomposition of 2 $Na_2CO_3$.3 $H_2O_2$, a product having the formula 2 $Na_2CO_3$. 2 $H_2O_2$ can result.

While the invention has been described in terms of specific and preferred embodiments and examples, those skilled in the art will recognize that various modifications can be made without departing from the spirit and scope of the invention.

The priority application, German Patent App. Ser. No. D 43 29 205.4, filed in Germany on Aug. 31, 1993, is relied on and entirely incorporated herein by reference.

We claim:

1. A method for production of granular sodium percarbonate, comprising:

conveying an aqueous hydrogen peroxide solution through a first channel in a spray nozzle;

conveying an aqueous sodium carbonate solution through a second and separate channel in the spray nozzle;

conveying a propellant through a third and separate channel in the spray nozzle;

spraying the hydrogen peroxide solution and the sodium carbonate solution into a fluidized bed which contains nuclei whose dimensions are less than those of the granulate particles to be produced, wherein the nuclei includes a material selected from the group consisting of sodium percarbonate, sodium carbonate, sodium percarbonate hydrates, sodium carbonate hydrates, zeolites and mixtures thereof;

mixing the hydrogen peroxide solution and the sodium carbonate solution outside of the spray nozzle; and evaporating water, wherein the fluidized bed is maintained at a temperature in the range of 40° to 95° C.; wherein the hydrogen peroxide solution, the sodium carbonate solution and the propellant are conveyed through a ternary atomizer nozzle which provides external mixing, as the spray nozzle; wherein the ternary atomizer nozzle includes a nozzle body and a nozzle mouthpiece, wherein the nozzle mouthpiece includes a central tube, an inner jacket tube, and an outer jacket tube arranged coaxially around the central tube; wherein one of the hydrogen peroxide solution or the sodium carbonate solution is conveyed through the central tube, the other solution or the propellant is conveyed through an inner annular slot formed between the central tube and the inner jacket tube, and the other solution or the propellant is conveyed through an outer annular slot formed between the inner and outer jacket tubes; and wherein no phosphorus-containing crystallization inhibitor is added to the hydrogen peroxide solution or the sodium carbonate solution.

2. The method according to claim 1, wherein the aqueous hydrogen peroxide solution has an $H_2O_2$ content in the range of 40 to 70% by weight, and the aqueous sodium carbonate solution has an $Na_2CO_3$ content above 20% by weight.

3. The method according to claim 1, wherein the fluidized bed is maintained at a temperature in a range of 50° to 70° C.

4. The method according to claim 1, wherein the production of granular sodium percarbonate is a continuous operation.

5. The method according to claim 1, wherein the fluidized bed is charged with nuclei in an amount of up to 30 kg of nuclei per 100 kg of granular sodium percarbonate removed from the fluidized bed.

6. The method according to claim 5, wherein 1 to 10 kg of nuclei is charged into the fluidized bed per 100 kg of granular sodium percarbonate removed from the fluidized bed.

7. The method according to claim 1, further including the step of classifying granular sodium percarbonate discharged from the fluidized bed.

8. The method according to claim 1, further including the step of removing granular sodium percarbonate from the fluidized bed.

9. The method according to claim 8, wherein the sodium percarbonate has a moisture content between 2 and 10% by weight.

10. The method according to claim 8, further including the step of drying the sodium percarbonate.

11. The method according to claim 8, further including the step of post-treating the sodium percarbonate to increase its stability.

12. The method according to claim 1, further including the step of conveying a propellant through the ternary nozzle, wherein the propellant is conveyed through a third and separate channel defined in the spray nozzle.

13. The method according to claim 1, wherein the central tube of the ternary atomizer nozzle extends beyond the ends of the jacket tubes by at least one central tube radius.

14. The method according to claim 13, wherein the central tube extends 2 to 10 central tube radii beyond the ends of the jacket tubes.

15. The method according to claim 13, wherein the central tube extends 3 to 6 central tube radii beyond the ends of the jacket tubes.

* * * * *